(12) United States Patent
Bickle et al.

(10) Patent No.: US 6,340,534 B1
(45) Date of Patent: Jan. 22, 2002

(54) WRAPPED SLIDE BEARING BUSHING

(75) Inventors: Wolfgang Bickle, Reilingen; Werner Schubert, Wiesloch, both of (DE)

(73) Assignee: KS Gleitlager GmbH, St. Leon-Rot (DE)

( * ) Notice: Subject to any disclaimer, the term of this patent is extended or adjusted under 35 U.S.C. 154(b) by 0 days.

(21) Appl. No.: 09/423,305

(22) PCT Filed: Jun. 20, 1998

(86) PCT No.: PCT/EP98/03786

§ 371 Date: Nov. 10, 1999

§ 102(e) Date: Nov. 10, 1999

(87) PCT Pub. No.: WO99/01675

PCT Pub. Date: Jan. 14, 1999

(30) Foreign Application Priority Data

Jul. 3, 1997 (DE) .......................................... 197 28 497

(51) Int. Cl.$^7$ ................................................. H05K 5/02
(52) U.S. Cl. ........................ 428/626; 428/611; 428/553; 428/564; 428/614; 428/293.1; 384/911; 384/908
(58) Field of Search ................................. 428/626, 611, 428/553, 564, 614, 293.1; 384/911, 908, 912

(56) References Cited

U.S. PATENT DOCUMENTS

| | | | |
|---|---|---|---|
| 4,312,772 A | * | 1/1982 | Mori |
| 4,394,275 A | * | 7/1983 | Bickle et al. |
| 4,655,944 A | * | 4/1987 | Mori |
| 4,847,135 A | * | 7/1989 | Braus et al. |
| 5,629,087 A | * | 5/1997 | Hartman |
| 5,836,699 A | * | 11/1998 | Back et al. |

FOREIGN PATENT DOCUMENTS

| | | |
|---|---|---|
| DE | 29 35 205 A1 | 4/1981 |
| DE | 28 57 283 C1 | 6/1983 |
| DE | 41 06 001 A1 | 8/1991 |
| DE | 42 00 385 A1 | 7/1993 |
| EP | 0 232 922 A1 | 8/1987 |
| EP | 0 632 208 A1 | 1/1995 |
| GB | 2 036 194 A | 6/1980 |
| GB | 2 139 236 A | 11/1984 |
| JP | 60-72952 | 4/1985 |
| JP | 61-148238 | 7/1986 |
| JP | 62-95332 | 5/1987 |

OTHER PUBLICATIONS

Literature: "Wartungsfreie Gleitlager" of ihg Gleitlager 1981 (no month).

* cited by examiner

Primary Examiner—Deborah Jones
Assistant Examiner—Jason Savage
(74) Attorney, Agent, or Firm—Jones, Tullar & Cooper, P.C.

(57) ABSTRACT

A wrapped slide bearing bushing consists of a composite bushing material including a metal bearing layer, a porous support layer sintered thereon, and a PTFE-based sliding layer, forming the sliding surface of an associated sliding member, said sliding layer also filling the pores of said support layer, and including at least 60 vol % of PTFE, 15–25 volume percent of a metal filler, preferably lead, and optionally 8–12 volume percent of PVDF. To obtain a low coefficient of friction, only varying in a narrow range over a long time period, said slide bearing bushing is formed such that the sliding layer includes 1–3 volume percent of carbon fibers, said carbon fibers being oriented substantially in a preferred direction relative to said composite bushing material, while the relative movement of said bearing bushing and said associated sliding member is substantially transverse to said preferred direction.

9 Claims, 2 Drawing Sheets

| Load Change | P10 | P16 | P18 |
|---|---|---|---|
| 1 | 0.049 | 0.046 | 0.043 |
| 600 | 0.048 | 0.045 | 0.043 |
| 500,000 | 0.037 | 0.042 | 0.046 |
| 100,000 | 0.048 | 0.037 | 0.049 |
| 200,000 | 0.045 | 0.055 | 0.047 |
| 300,000 | 0.049 | 0.062 | 0.049 |
| 500,000 | 0.092 | 0.080 | 0.065 |
| 650,000 | 0.120 | 0.089 | 0.072 |
| 750,000 |  | 0.104 | 0.082 |
| 1,000,000 |  | 0.126 | 0.080 |
| 1,250,000 |  |  | 0.076 |
| 1,500,000 |  |  | 0.080 |

WRAPPED SLIDE BEARING BUSHING

FIELD OF THE INVENTION

The present invention relates to a wrapped slide bearing bushing made of a composite slide bearing material with a metallic support layer, a porous bearer layer sintered on the latter, and a slide layer on a PTFE (polytetrafluoroethylene) base, which constitutes the slide surface for a slide partner, which fills pores in the porous bearer layer, and which comprises at least 60% by volume of PTFE, 15 to 25% by volume of a metallic filler material, preferably lead, and, if desired, 8 to 12% by volume of PVDF (polyvinylidenefluoride).

BACKGROUND OF THE INVENTION

In the slide layer on the PTFE basis, the PTFE is intended to exert a matrix-forming function; thus, it must be present in such a percentage of the volume that it can enclose the metallic filler and the possibly also present PVDF. If no PVDF is provided, the PTFE portion should be at least 70% by volume.

The metallic filler material preferably is lead; however, it would also be possible to use zinc sulfide, for example.

The metallic support layer is preferably composed of steel, however, a highly-stable aluminum alloy or bronze could also be employed. The porous bearer layer sintered thereon preferably consists of tin bronze or leaded tin bronze.

Slide bearing bushings of this type, as well as the composite slide bearing materials on which they are based, are known. For example, Applicant offers slide bearing bushings, whose slide layer is constituted by a mixture of 80% by volume of PTFE and 20% by volume of lead. Moreover, a slide bearing material has been proposed in European Patent EP 0 632 208 A1, whose slide layer comprises 70% by volume of PTFE and 20% by volume of a metallic filler material, as well as 10% by volume of PVDF.

Wrapped slide bearing bushings made of the above described composite slide bearing materials do perform satisfactorily. They have a low coefficient of friction or frictional index and are distinguished by great wear resistance.

In connection with a special application of wrapped slide bearing bushings in shock absorbers of motor vehicles, the number of constantly occurring load changes in the course of the useful life of the motor vehicle is extremely high. Because of this, the actual slide layer, i.e. the amount projecting past the porous bearer layer, wears off, so that the individual plateaus of the porous bearer layer start to wear. The slide bearing bushing does not lose its ability to function because of this. However the damping behavior changes and the coefficient of friction is increased.

SUMMARY OF THE INVENTION

Based on the foregoing, the object of the present invention lies in providing a wrapped slide bearing bushings having an even higher wear resistance, wherein the coefficient of friction remains below 0.1 over an extended period of time.

In a wrapped slide bearing bushings of the type described at the outset, this object is attained by the present invention in that the slide layer contains 1 to 3% by volume of carbon fibers, and that the carbon fibers are essentially oriented in a preferred, or given direction with respect to the composite slide bearing material, and the relative movement of the bushings and the sliding partner used with it essentially extends transversely with regard to this preferred direction.

In a manner in accordance with the present invention it was found that wear is reduced by the inclusion of carbon fibers in the mentioned percental amount in the slide layer, and because the carbon fibers are provided with an orientation in a preferred direction, which is selected in such a way that it extends transversely with regard to the defined relative movement of the sliding partners. The sliding partners are the bushing and the piston, or respectively the cylinder wall, in the case of an application in shock absorbers, or the bushing and the shaft, or respectively pinion, which is rotatable therein, in the case of an application of the bushing in a pivot bearing.

If an orientation of the carbon fibers essentially in or with respect to a preferred direction has been referred to above, it is understood that the carbon fibers need not necessarily be oriented parallel in relation to each other in the strictest sense, nor that each individual fiber needs to extend in this preferred direction. Instead, this means that the plurality of the fibers have undergone an orientation in this preferred direction. Therefore more than 50% of all fibers are oriented in such a way that they form an angle of less than 30° with the preferred direction. In a very particularly preferred manner, the carbon fibers are oriented even more completely, or respectively more extensively, in the preferred direction. It was determined that it is possible to reduce wear in a bushing produced in accordance with the present invention in comparison with the slide bearing bushings mentioned at the outset, if the subsequent friction partners extend transversely to the extension of the carbon fibers, i.e. in this preferred direction.

The carbon fibers preferably have a length of 50 to 300 $\mu$m and a thickness of 5 to 20 $\mu$m. In a particularly advantageous manner the length is 50 to 200 $\mu$m and the thickness 8 to 15 $\mu$m. It has been shown that with carbon fibers of these dimensions it is possible to achieve a very extensive orientation of the carbon fibers, which constitutes the preferred direction. The tribologic properties of the composite slide bearing material achieved in this way are particularly good.

With a preferred embodiment of the present invention, the slide layer contains a carbon fiber proportion of 1.5 to 2.5% by volume, as well as a proportion of a metallic filler, preferably lead, of 18 to 22% by volume.

In a preferred manner the preferred direction of the carbon fibers is selected to be such that it extends in the circumferential direction of the slide bearing bushing, if the slide bearing bushing is intended to be used in a shock absorber. With this application the bushing has either been pressed into the cylinder and is used as the sliding partner for a reciprocating piston, or it can be displaced with the piston and is therefore provided with a radial outer slide layer and moves, together with the piston, in the axial direction against an inner cylinder surface. Although the above use of the slide bearing bushing of the present invention is particularly preferred, other uses of the slide bearing bushing are also conceivable.

The preferred direction of the carbon fibers is selected to be parallel with the longitudinal bushing axis, if the bushing is intended to be used in a pivot bearing.

Further characteristics, details and advantages of the present invention ensue from the illustration of sections through the composite material of a slide bearing bushing in accordance with the present invention and the description of a comparing measurement of the coefficient of friction.

DESCRIPTION OF THE PREFERRED EMBODIMENTS

The production of a steel support layer and of a porous bronze layer sintered thereon are known per se and will not require a detailed description. The slide material, which will be applied to, or respectively placed into, the porous bronze layer as well as the pores of the porous bronze layer, is prepared from an aqueous PTFE dispersion, to which toluene and triton are added. The mixture is stirred. Then a composition of carbon fibers coated with PTFE, which can be obtained from the DuPont company under the tradename of PDR 9650, is added and stirred in. Aluminum nitrate is introduced as a precipitation agent into the PTFE mixture, and lead, which is provided in a slurry form, is stirred in. The mixture obtained in this way is rolled onto the porous bronze layer, wherein the thickness of the slide layer over the tips or plateaus of the bronze layer is approximately between 5 and 50 $\mu$m. The slide layer is preferably applied with a projection of between 20 to 25 $\mu$m above the tips or plateaus of the bronze layer. With such a dimension of the rolling gap the pores, on the one hand, can be completely filled with the plastic slide bearing material, without the bronze sinter lattice being compressed, and in the course of rolling-in an orientation of the carbon fibers is achieved, which corresponds to the circumferential direction of the rollers.

Following the rolling-in of the slide layer mixture, the composite slide bearing material is subjected to a heat treatment. Once the solvents have been evaporated after this, the slide layer of the composite slide bearing material here considered contains 2% by volume of carbon fibers, 20% by volume of lead and 78% by volume of PTFE.

To produce wrapped slide bearing bushings for application in shock absorbers, plate sections are cut in the rolling direction and are therefore rolled around a vertical axis, so that the preferred direction of the carbon fibers extends in the circumferential direction of the bushing. The relative movement of the sliding partners in the case of shock absorber use thus extends transversely, or respectively vertically, with respect to the orientation of the fibers.

Figure 1:
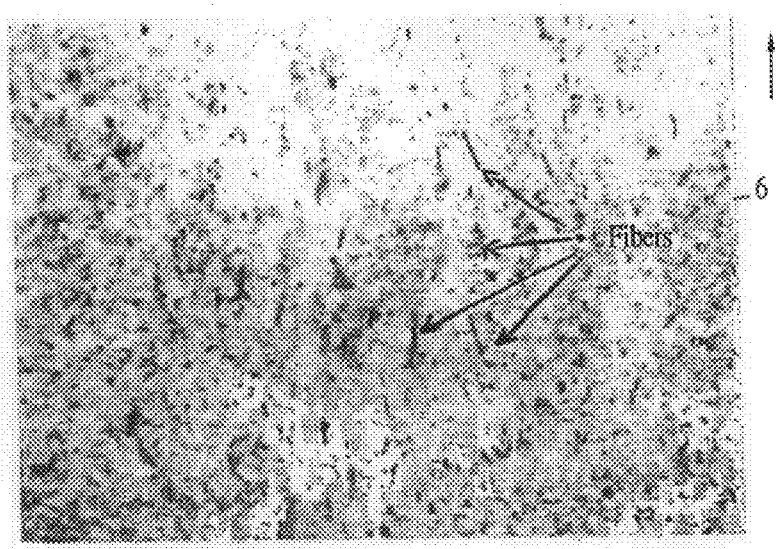
FIG. 1, is a photographic view of the composite slide bearing material in a view from above on the slide layer.
Figure 2:
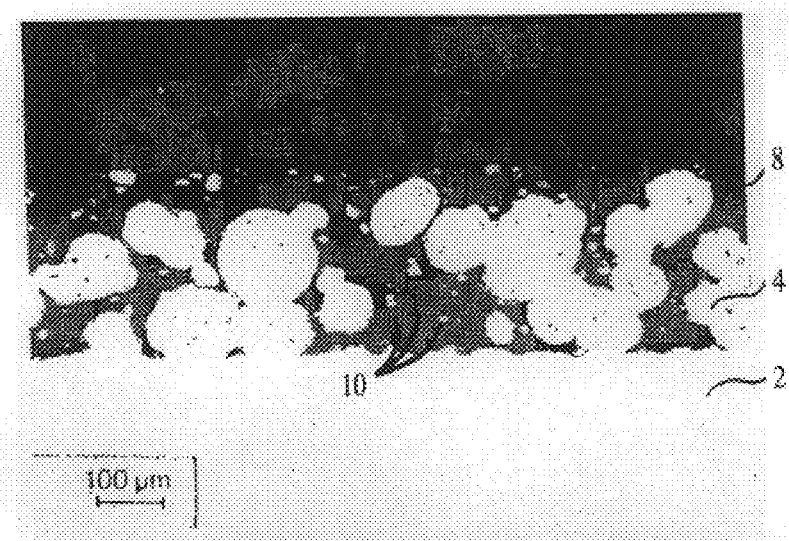
FIG. 2, is a micrograph through a composite slide bearing material perpendicularly to the preferred direction.
Figure 3:
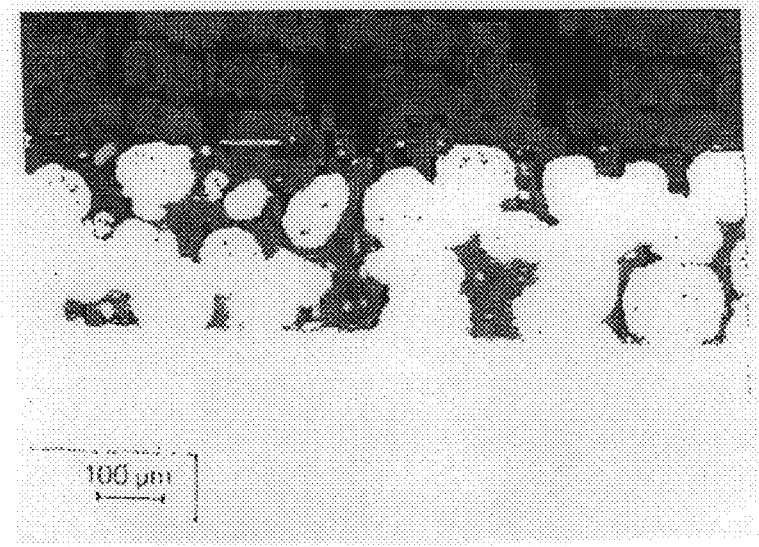
FIG. 3, is a micrograph of the composite slide bearing material of FIG. 1 in the preferred direction.

FIG. 1 shows a photographic view of the composite slide bearing material of the present invention in a view from above on the slide layer. The dark, linearly extending fibers and the preferred direction, extending from the bottom to the top in the representation in FIG. 1, can be seen. FIG. 2 shows a micrograph in the transverse direction, and FIG. 3 a longitudinal micrograph extending parallel with the belt movement direction. A support layer, made of steel, of the composite slide bearing material is identified by the reference numeral 2. The porous, sintered-on bronze layer is identified by the reference numeral 4. The carbon fibers 6, which are oriented in a preferred direction, can be seen in the drawing figures. They are contained in the slide layer on the PTFE basis, identified by the reference numeral 8 as a whole, which completely fills the pores of the bearer layer 4, as well as the filler 10 made of lead and also contained therein.

Figures 4, 5:
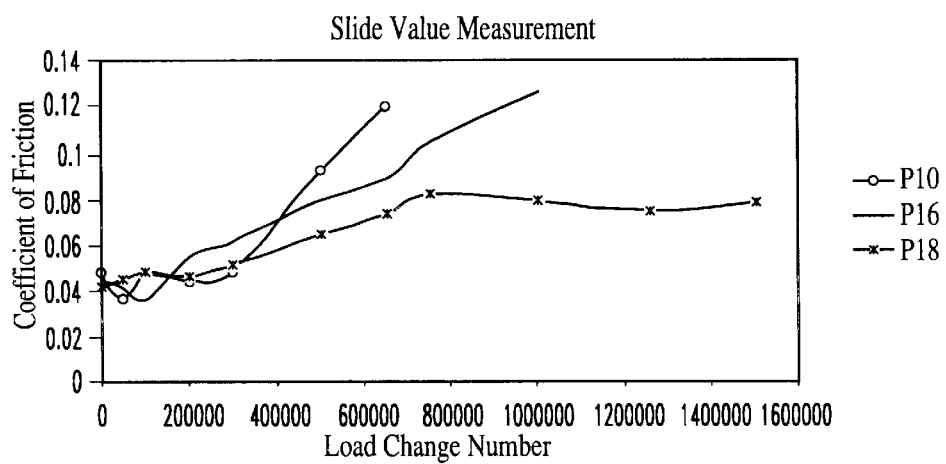
FIG. 4, is a table with results of a measurement of the coefficient of friction.
FIG. 5, is an illustration of the results of the measurement of the coefficient of friction in accordance with FIG. 4.

A measurement of the coefficient of friction was performed, in which two slide bearing bushings made of the composite slide bearing material mentioned at the outset, and a slide bearing bushings made in accordance with the present invention, were compared with each other. The bushing with the identification P10 has a slide layer consisting of 80% by volume of PTFE and 20% by volume of lead; the bushing with the identification P16 has a slide layer consisting of 70% by volume of PTFE, 20% by volume of lead, and 10% by volume of PVDF, and the slide bushing produced in accordance with the present invention with the identification P18 has a slide layer, which consists of 78% by volume of PTFE, 20% by volume of lead, and 2% by volume of carbon fibers. The thickness of the slide layer above the tips or plateaus of the porous bronze layer is respectively 23 $\mu$m. Each of the bushings was tested in a shock absorber test stand. To this end, the bushings were subjected to an endurance run with two load changes superimposed on each other, namely a first stroke of ±40 mm, frequency 1 Hertz (sine-shaped), and a second stroke of ±8 mm, frequency 12 Hertz (sine-shaped). For this purpose, the bushings were clamped in a cylinder and a shaft, simulating the shock absorber piston, was moved up and down in the above described manner. In this case the shaft was loaded vertically with respect to the direction of movement with a lateral load of 2 N/mm². A measurement of the coefficient of friction was performed after each load change, which can be seen in the table in FIG. 4. In this case the shaft was moved at a frequency of 0.08 Hertz (triangular shape) by ±50 mm with respect to the bushing. During this, a lateral load of 4 N/mm² was selected. In the course of this coefficient of friction measurement, the force required for displacing the shaft was measured and the coefficient of friction determined from this. This coefficient of friction can be seen in the table in FIG. 3 and is applied over the load change number in FIG. 4. It can be seen that the slide bearing bushings P10 and P16 exceed a coefficient of friction of 0.1 above a load change number of 500,000, or respectively 800,000. While the tested bushings showed comparative behavior in a load change range up to 400,000, the slide bearing bushing produced in accordance with the present invention is distinguished by a much greater wear resistance. Obviously, up to load change numbers of 1.6 million there is no complete removal of the slide layer down to the tips or plateaus of the porous bronze layer, or of a change in the damping behavior connected therewith because on an increasing coefficient of friction.

What is claimed is:

1. A wrapped slide bearing bushing for a sliding partner, the bushing comprising:
   a metallic support layer;
   a porous bearing layer sintered on said metallic support layer; and
   a slide layer of a composite slide bearing material applied to said porous bearing layer, said composite slide bearing material which is at least 60% by volume of PTFE, 15 to 25% by volume of a metallic filler material and 1 to 3% by volume of carbon fibers, wherein:
      said carbon fibers are essentially oriented in a given direction of said composite slide bearing material; and
      the relative movement of the bushing and the sliding partner essentially extends transversely to said given direction.

2. The wrapped slide bearing bushing as defined in claim 1, wherein said slide layer has a proportion of carbon fibers of 1.5 to 2.5% by volume.

3. The wrapped slide bearing bushing as defined in claim 1, wherein the proportion of metallic filler material is 18 to 22% by volume.

4. The wrapped slide bearing bushing as defined in claim 1, wherein said given direction of said carbon fibers extends in a circumferential direction of the wrapped slide bearing bushing.

5. The wrapped slide bearing bushing as defined in claim 1, wherein the wrapped slide bearing bushing defines a longitudinal axis, and wherein the wrapped slide bearing bushing defines a circumference, and wherein said given direction of said carbon fibers extends parallel with the longitudinal axis of the wrapped slide bearing bushing.

6. The wrapped slide bearing bushing as defined in claim 1, wherein said carbon fibers have a length of 50 to 300 $\mu$m.

7. The wrapped slide bearing bushing as defined in claim 1, wherein said carbon fibers have a length of 50 to 200 $\mu$m.

8. The wrapped slide bearing bushing as defined in claim 1, wherein said carbon fibers have a thickness of 5 to 20 $\mu$m.

9. The wrapped slide bearing bushing as defined in claim 1, wherein said carbon fibers have a thickness of 8 to 15 $\mu$m.

* * * * *